United States Patent [19]

Raley, Jr.

[11] 4,012,343

[45] Mar. 15, 1977

[54] CROSSLINKED OLEFIN POLYMER HAVING IMPROVED FLAME RETARDANCE

[75] Inventor: Charles F. Raley, Jr., Midland, Mich.

[73] Assignee: The Dow Chemical Company, Midland, Mich.

[22] Filed: Sept. 9, 1974

[21] Appl. No.: 504,019

Related U.S. Application Data

[63] Continuation-in-part of Ser. No. 53,332, July 8, 1970, abandoned, and Ser. No. 168,756, Aug. 3, 1971, abandoned.

[52] U.S. Cl. .................. 260/2.5 FP; 204/159.2; 260/2.5 HA; 260/28.5 A; 260/28.5 AV; 260/45.7 P; 260/DIG. 24

[51] Int. Cl.² .................. C08J 9/10; C08K 3/02; C08K 5/02

[58] Field of Search .......... 260/2.5 FP, 2.5 AJ, 260/2.5 HA, 45.7 P, 28.5 A, 28.5 AV

[56] References Cited

UNITED STATES PATENTS

| | | | |
|---|---|---|---|
| 3,330,783 | 7/1967 | Piechota et al. | 260/2.5 AJ |
| 3,341,480 | 9/1967 | Feild | 260/2.5 HA |
| 3,373,135 | 3/1968 | Jenkner et al. | 260/45.7 P |
| 3,551,379 | 12/1970 | Dany et al. | 260/45.7 P |
| 3,597,385 | 8/1971 | Komorniczyk et al. | 260/45.7 P |
| 3,650,300 | 3/1972 | Listner | 260/45.7 P |

FOREIGN PATENTS OR APPLICATIONS

| | | | |
|---|---|---|---|
| 1,028,553 | 5/1966 | United Kingdom | 260/2.5 AJ |

*Primary Examiner*—Wilbert J. Briggs, Sr.
*Attorney, Agent, or Firm*—Michael S. Jenkins

[57] ABSTRACT

Markedly improved flame retardance is imparted to crosslinked olefin polymers containing halogenated organic moiety by incorporating therein elemental red phosphorus. The resulting flame retardant compositions are particularly useful in fabrication of crosslinked olefin polymer foams.

14 Claims, No Drawings

CROSSLINKED OLEFIN POLYMER HAVING IMPROVED FLAME RETARDANCE

CROSS REFERENCES TO RELATED APPLICATIONS

This is a continuation-in-part of Ser. No. 53,332 filed July 8, 1970 and of Ser. No. 168,756 filed Aug. 3, 1971, both now abandoned.

BACKGROUND OF THE INVENTION

This invention relates to flame retardant or self-extinguishing crosslinked polymer compositions which contain a normally flammable and/or poorly flame retardant crosslinked olefin polymer, elemental phosphorus and halogenated organic moiety.

By reason of their favorable physical properties and relatively low cost, olefin polymers have been used for most widely diverse applications including applications as solid molding materials and as foamed compositions.

For many applications, however, plastic materials having heat resistances generally higher than those possessed by typical olefin polymers are required. Accordingly, it has been a practice to employ various crosslinking means such as irradiation, chemical crosslinking agents, heat and combinations thereof in the fabrication of olefin polymers in order to increase their heat resistance. The resultant crosslinked polymers are useful in the fabrication of heat resistant solid and formed articles.

In recent times, it has become increasingly important to impart flame resistant properties to such olefin polymers. This is particularly true where solid olefin polymers are used as insulating material in the electrical industry and where foamed olefin polymers are used as insulation and to prevent risk of fire in the daily use of other items.

It has been proposed heretofore to impart flame-retardancy to an olefin polymer by incorporating various additives into the polymer. Flame-retardance has been obtained, for instance, by combining with the polymer a solid chlorinated hydrocarbon, e.g., chlorinated paraffin, with a flame-retardant inorganic oxide, preferably antimony oxide, in critical proportions to each other and to the polymer. Such compositions are described in U.S. Pats. Nos. 2,480,298, 2,590,211 and 2,669,521.

Unfortunately, in many crosslinked olefin polymers, very substantial amounts of such additives must be employed in order to obtain a polymer having suitable fire-retardance. In addition, antimony oxide is a potential environmental pollutant. Also, polymers containing such large amounts of additive often require additional radiation or other crosslinking means in order to achieve the desired degree of crosslinking.

In view of these disadvantages it would be highly desirable to provide a more economical and less toxic means for rendering crosslinked olefin polymers flame-retardant or self-extinguishing.

SUMMARY OF THE INVENTION

The present invention is an improved fire retardant crosslinked olefin polymer composition containing a halogenated organic moiety, wherein the improvement comprises the crosslinked olefin polymer composition containing a fire-retarding amount of elemental phosphorus having a specific gravity greater than 2.

As contrasted with prior art, flame retardant crosslinked olefin polymer compositions containing a non-flammable oxide or oxychloride of antimony, bismuth and arsenic, the composition of the present invention contains elemental phosphorus which burns readily. Therefore, it is surprising that the composition of the present invention has flame retardant or self-extinguishing characteristics substantially better than conventional flame retardant or self-extinguishing crosslinked olefin polymers which contain antimony oxide.

In addition to flame retardancy, this composition retains essentially all of the desirable physical characteristics of the crosslinked olefin polymer and is accordingly a further improvement over prior art compositions. In fact, it is found that the compositions of the present invention are more resistant to photodegradation than the olefin polymers from which they are made. Also the residues of the compositions of the present invention are non-toxic. Therefore such compositions are utilized in any application which conventionally employs crosslinked olefin polymers. Illustratively, such applications include solid olefin polymers for use in insulation of electrical cables and the like; foamed olefin polymers for use in construction, e.g., building panel splines; electrical appliances, e.g., refrigeration cold line insulation; gasketing; carpet pads; adhesive tapes; packaging; and the like.

For the purposes of this invention, the term "crosslinked olefin polymer composition" means a composition comprising a crosslinked olefin polymer and a halogenated organic moiety which composition burns for a measurable period of time when exposed to flame.

The crosslinked olefin polymer compositions are generally compositions which do not self-extinguish within one second upon removal of flame therefrom which exhibit improved flame retardance as a result of the incorporation of elemental phosphorus.

The term "crosslinked olefin polymer" is defined as a polymer of α-olefin, inclusive of homopolymers and copolymers and mixtures thereof which have been crosslinked at least to the "gel point", defined as one crosslink per weight average chain. Crosslinking and gel point are further described by A. Charlesby in "Atomic Radiation and Polymers", Pergamon Press, Ltd., Chap. 9, 137–143 (1960).

DESCRIPTION OF PREFERRED EMBODIMENTS

Of particular interest are the normally solid, high and low density crosslinked homopolymers and copolymers of α-monoolefins and substituted α-monoolefins wherein α-monoolefin is ethylene, propylene, butene-1, isobutylene or other aliphatic α-monoolefin having from 4 to 12 carbon atoms. Substituted α-monoolefins include those wherein the substituents can be halo, alkyl or haloalkyl having from 1 to 12 carbon atoms; carboxylic acid having from 3 to 8 carbon atoms; alkyl or haloalkyl ester of carboxylic acid wherein alkyl or haloalkyl has from 1 to 12 carbon atoms, α-alkenyl having 2 to 12 carbon atoms; acyl having from 1 to 12 carbon atoms; carboxylate having from 1 to 12 carbon atoms; alkoxyl having from 1 to 12 carbon atoms; aryloxy having 6 to 12 carbon atoms; and others which are generally chemically inert to elemental phosphorus at temperatures up to those used to fabricate the resulting polymer composition. It is further understood that combinations of such substituents are included. Exemplary substituted α-monoolefins are vinyl chloride, vinyl bromide, vinylidene chloride, acrylic acid, methacrylic acid, ethyl acrylate, n-butyl acrylate, i-butyl acrylate, diethyl maleate, ethyl hydrogen maleate, methyl ethacrylate, dibutyl itaconate, vinyl acetate, vinyl propionate, vinyl benzoate, vinyl ethyl ether, methyl vinyl ketone, acrylamide, acrylonitrile and the like.

It is understood that "olefin polymer" includes α-monoolefin/α-monoolefin copoylmers such as elastomeric and non-elastomeric ethylene/propylene copolymers and ethylene/butene-1-copolymers and copolymers of one or more α-monoolefins as defined hereinbefore with one or more substituted α-monoolefins as also defined hereinbefore. In such latter copolymers, the substituted α-monoolefin preferably constitutes up to about 50 weight percent of the copolymer with the remainder being α-monoolefin. It is also understood that special purpose comonomers such as crosslinking monomers, e.g., divinyl benzene, can be used in concentrations up to 5 weight percent or more depending on the comonomer and the characteristic desired. Also, the term "olefin polymer" includes halogenated polyolefins such as chlorinated polyethylene and chlorinated polypropylene containing from about 1 to about 40 weight percent of chlorine, preferably from 5 to 25 weight percent. In such halogenated polyolefins, the halogen bonded to the polyolefin backbone supplies all or part of the halogenated organic moiety.

Of special interest are the normally flammable homopolymers and copolymers of aliphatic hydrocarbon α-monoolefin monomers containing from 2 to 12 carbon atoms with the copolymers containing less than 50 mole percent of other copolymerizable monomer, especially less than about 30 mole percent.

Of primary interest are polyethylene, polypropylene, ethylene/ethyl acrylate copolymers, ethylene/acrylic acid copolymers and ethylene/vinyl acetate copolymers.

The term "elemental phosphorus" as used herein, refers to the colored allotropic forms of elemental phosphorus having specific gravities greater than 2.0. Specifically the term includes red phosphorus having specific gravity of about 2.34, black phosphorus having specific gravity of about 2.70, and violet phosphorus having specific gravity of about 2.36 all being described in The Handbook of Chemistry and Physics, 48th Ed., The Chemical Rubber Co., B-203 (1967–68). Also included are mixtures of the red, black and/or violet forms. Red phosphorus which is usually a brownish red powder of rhombohedral crystals and which is insoluble in water and carbon disulfide and is both non-poisonous and non-luminous is preferred. Preferred are powders having particle size less than about 200 microns, especially those less than about 150 microns.

By "halogenated organic moiety" is meant halogenated organic groups which form component part or parts of organic compounds, component part or parts of the olefin polymer macromolecules as defined hereinbefore or both. Preferably the halogenated organic moiety contains a plurality of bromine and/or chlorine atoms with the combined concentration thereof being in the range between about 1 to about 97 weight percent based on the halogenated organic moiety, most advantageously from about 5 to about 95 weight percent.

Examples of halogenated organic moiety as component part or parts of the olefin polymer macromolecules include olefins suitably copolymerized with vinyl chloride, vinylidene chloride, 2,3,3-tribromopropene, 2,3,3-trichloropropene, vinyl bromide, arbromostyrene, ar-chlorostyrene, ar-dibromostyrene and the like. Also included with such examples of olefin polymer macromolecules are chlorinated polyethylene and chlorinated polypropylene having chlorine concentration of from about 1 to about 40 weight percent.

In instances wherein one of the foregoing halogen-containing polymers is employed as an additive to a non-halogenated olefin polymer, the halogen-containing polymer contains from about 50 to about 80 weight prcent of the halogen.

Compounds having halogenated organic moiety which are operably employed in the practice of this invention are chemically inert to the elemental phosphorus described hereinbefore at temperatures from ambient up to the temperatures employed in incorporating the phosphorus and the halogenated organic compound into the olefin polymer and in fabricating the polymer to a desired shape. It is further required that the halogenated organic compounds are substantially inert to the olefin polymer at such temperatures. Preferably the halogenated organic compounds have chlorine and/or bromine in concentrations ranging from about 25 to about 97 weight percent based on halogenated organic compound, especially from 50 to 95 weight percent.

The most useful embodiments of the present invention are improvements of conventional fire retardant compositions of olefin polymers containing halogenated organic compounds and commonly having incorporated therein a fire retarding amount of antimony oxide. The improvement of these embodiments comprises substitution of elemental phosphorus, described hereinbefore, for at least a portion of the antimony oxide. Therefore, it is to be understood that halogenated organic compounds used heretofore in combination with antimony oxide for the purposes of rendering olefin polymers fire retardant are suitable halogenated organic compounds for the purposes of this invention. It is to be further understood that halogenated organic compounds not employed heretofore in combination with antimony oxide may also be suitably employed provided in the practice of this invention they are inert to the elemental phosphorus at polymer fabrication temperatures and below, i.e., the temperature at which the polymer begins to degrade and below.

Halogenated organic compounds which are suitably present in olefin polymer composition and which combine with the elemental phosphorus to provide effective fire retardance in olefin polymers are preferably the active halogenated compounds such as the active chlorinated, the active brominated, and the active chlorinated-brominated organic compounds; the passive brominated organic compounds; the passive chlorinated-brominated compounds, and mixtures thereof.

By "active chlorinated organic compound" is meant an organic compound which contains from about 25 to about 90 weight percent chlorine and which has either α-hydrogen and/or α-chlorine available for dehydrochlorination or dechlorination. Examples of active chlorinated compounds include chlorinated paraffins containing from about 50 to 80 weight percent chlorine, particularly those having chlorine content of about 60 to 75 weight percent and 18 to 40 carbon atoms in the molecular chain; chlorinated polyethylene particularly those having chlorine content above 30 weight percent preferably from about 50 to about 80 weight percent, chlorinated castor oil or chlorinated tall oil; chlorinated cyclichydrocarbons having from 5 to 12 carbon atoms such as hexachlorocyclohexane; hexachlorocyclododecane, etc; chlorinated acyclic hydrocarbons such as hexachloroethane, pentachloroethane, and hexachloropropane; and the like.

Active brominated compounds contain from about 30 to about 95 weight percent of bromine and have either α-hydrogen or α-halogen available for dehydrobromination or dehalogenation. Examples include hexabromocyclohexane, lower brominated cyclohexanes, octabromododecane, 1,2,3,4-tetrabromobutane, 1,2-dibromoethylbenzene, hexabromoethane, acetylene tetrabromide, hexabromocyclododecane, octabromohexadecane and the like.

By "passive brominated organic compound" is meant a compound in which the bromine atoms are relatively thermally stable, i.e., the compounds do not dehydrohalogenate or dehalogenate at temperatures below about 150° C. Passive brominated organic compounds are further defined as those having the bromine (s) substituted on aromatic carbon, vinyl carbon or otherwise situated such that no α-hydrogen or α-halogen is available for normal dehydrohalogenation or dehalogenation. Passive brominated organic compounds include carbocyclic aromatic bromine compounds represented by the chemical formula

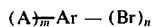

wherein Ar is a monocarbocyclic aromatic group such as phenyl, a condensed polycarbocyclic aromatic group such as naphthyl and anthracenyl, and a polycarbocyclic aromatic group such as biphenyl and terphenyl; A is hydrogen, hydroxyl, alkyl or haloalkyl (including polyhaloalkyl) having from 1 to 12 carbon atoms, aryl or haloaryl (including polyhaloaryl) having from 6 to 12 carbon atoms; halogen other than bromine, alkoxy or haloalkoxy (including polyhaloalkoxy) having from 1 to 12 carbon atoms, with the understanding that A can be one or more of the above in a particular aromatic bromine compound; m is 0 to 13; and n is 1 to 14. Passive brominated organic compounds also include acyclic aliphatic bromine compounds represented by the chemical formula

wherein X and Y are individually hydrogen, halogen, aryl, hydroxyaryl, vinyl and similar organic radicals which do not provide halogen normally removable or hydrogen at the α-position to Br and Z is an alkyl, hydroxyalkyl or haloalkyl (including polyhaloalkyl) having 1 to 12 carbon atoms, which alkyl, hydroxyalkyl or haloalkyl do not provide a normally removable hydrogen, halogen or hydroxyl in the α-position to Br; aryl, haloaryl (including polyhaloaryl) or hydroxyaryl having 6 to 12 carbon atoms; vinyl or halovinyl including polyhalovinyl; alkoxy, aryloxy, and haloaryloxy. Also included are esters of carboxylic acids and inorganic acids such as phosphoric acid wherein the ester moiety contains a thermally stable bromine. Also suitable are alcohols having acyclic vinylic bromine radicals represented by the formula

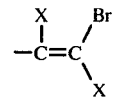

wherein X is halogen, hydrogen, alkyl or haloalkyl, including polyhaloalkyl, having from 1 to 12 carbon atoms. Illustrative passive brominated compounds include the following: hexabromobenzene, pentabromobenzene; tetrabromobenzene; 2,4,6-tribromophenylacrylate; tribromobiphenyl; octabromobiphenyl; decabromobiphenyl; pentabromodiphenyl ether; hexabromodiphenyl ether; octabromodiphenyl ether; decabromodiphenyl ether; 2-(2,4,6-tribromophenoxy)ethyl acrylate; 1,2-bis (p-2,3,3-tribromoallyloxyphenyl)-1,2-dibromoethane; 1-(2,4,5-tribromophenyl) (2,4,6-tribromophenyoxy)ethane; tetrabromobisphenol-A; 2,3,3-tribromoallyl ethers of tetrabromobisphenol-A; bis(2,4,6-tribromophenyl)ether of 1,4-butanediol; bis(2,4,6-tribromophenyl)ether of 1,2-ethane-diol; 2,4,6-tribromophenyl ether of 2,3,4-tribromo-2-butenol; 1,1-bis(tribromophenoxymethyl)ethane; bis(tribromophenyl) ether of 1,4-butynediol; bis(pentabromophenyl) ether of 1,4-butynediol; bis(tribromophenyl) ether of 1,4-butenediol; bis(pentabromophenyl) ether of 1,4-butenediol; bis(2,3-dibromo-2-butenediol) ester of tris(bromomethyl) acetic acid; 1-(2,4,5-tribromophenoxy)-1-(pentabromophenyl) ethane; 1-(2,4,5-tribromophenoxy)-1-(trichlorophenyl) ethane; 1-(2,4,5-tribromophenoxy)-1-(pentachlorophenyl) ethane; (2,3-dibromo-2-butenyl)bis(tribromophenylcarbonate); (2,3-dibromo-2-butenyl)bis(tribromophenoxyacetate); 2,3,3-tribromoallyl 1,2,4-tribromophenyl ether; tris(pentabromophenyl)phosphate; tris(tribromoneopentyl)phosphine; pentaerythrityltribromide; tetrabromophthalic anhydride; pentaerythrityltetrabromide; tribromoneopentyl alcohol esters and 2,3,3-tribromoallyl alcohol esters of saturated and unsaturated carboxylic acids such as formic, acetic, acrylic, methacrylic, propionic and similar such acids having less than 18 carbon atoms; 2,3,3-tribromoallyl 2,4,6-tribromophenyl ether, 2,3,3tribromoallyl 4 -bromophenyl ether, 2,3,3-tribromoallyl alcohol esters and tribromoneopentyl alcohol esters of inorganic acids such as phosphoric acid; bromonaphthalene and polybromonaphthalene, 2,4,6-tribromophenyl acrylate, bis(2,3,3-tribromoallyl) maleate, 2,2-bis[3,5-dibromo-4-(2,3,3-tribromoallyloxy)phenyl]propane; 2,3,3-tribromoallyl triphenylmethyl ether; 2,2-bis[3,5-dichloro-4-(2,3,3-tribromoallyloxy)phenyl]propane; 2,3,3-tribromoallyl 1,6-dibromo-2-naphthyl ether; 2,3-dibromo-2-butenyl 2,4,6-tribromophenyl ether; 2,3-dibromo-2-butenyl 2,6-dibromo-4-T-butyl phenyl ether; and the 2-ethylhexyl-, n-octyl-, nonyl-, butyl-, dodecyl-, and 2,3-dioxypropyl ethers of tribromophenol.

Exemplary active or passive brominated-chlorinated organic compounds include bromochlorocycloalkanes such as pentabromomonochlorocyclohexane tribromotrichlorocyclohexane, tetrabromodichlorocyclohexane, tetrachlorodibromoethane, tribromomonochlorodiphenyl ether, tribromodichlorodiphenyl ether, and the 2-ethylhexyl-, n-octyl-, nonyl-, butyl-, dodecyl-, and 2,3-dioxypropyl ethers of tribromomonochlorophenol and tribromodichlorophenol.

Halogenated organic compounds which are also operable for the purposes of this invention include pentachloroethane, hexachloroethane, 2,2-bis[3,5-dibromo-4-(2,3,3-tribromoallyloxy)phenyl]propane, hexachlorocyclopentadiene, chlorinated diphenyl, dimerized hexachlorocyclopentadiene, hexachloroendomethylene tetrahydrophthalic acid and its derivatives, tetrachlorobutyrolactone, tetrachlorobutanediol diacetate, polyvinyl chloride, post-chlorinated polyvinyl chloride, chlorinated polybutadiene or polyisoprene, and the like. Moreover, operable halogenated organic compounds include trihaloalkyl phosphites and phosphates, e.g., tris-(2-chloroethyl)-phosphite, tris-(2,3-dibromopropyl)phosphite, tris(2,3-bromopropyl)-phosphate, tris(2,3-dichloropropyl)phoshite, and the like. Although not usually employed for economic reasons, similar iodinated organic compounds may be suitably employed. Mixtures of two or more of the aforementioned halogenated organic compounds can be employed. A particularly effective mixture contains a halogen-containing aliphatic or cycloaliphatic compound having a hydrogen or halogen atom attached to a carbon atom alpha to a halogen-substituted carbon atom, e.g., chlorinated paraffin, hexabromocyclohexane and the like, and a bromine-containing aromatic compound wherein bromine is substituted on the aromatic ring or bromine-containing acyclic compound having either a vinylic bromine or not having a hydrogen or halogen atom attached to a carbon atom alpha to a bromine substituted carbon atom, e.g., hexabromobenzene, pentabromobenzene and tribromoneopentyl and 2,3,3-tribromoallyl esters of carboxylic acids such as formic, acetic, maleic, propionic or inorganic acids such as phosphoric.

The amount of elemental phosphorus employed in the practice of this invention depends primarily on the degree of fire retardance required and secondarily on the particular crosslinked olefin polymer, the conditions of the crosslinking process and on the type and amount of halogenated organic moiety to be used. For the purposes of this invention, a flame retarding amount of phosphorus is that amount which when incorporated into the crosslinked olefin polymer composition measurably reduces the tendency of that composition to burn. Generally it is desirable to render the crosslinked olefin polymer self-extinguishing, i.e., nonburning with flame for more than 30 seconds after removal of flame used to heat and ignite a standard test bar (solid or foamed) of the composition as determined by a multiple ignition test described hereinafter, although improvement of fire retardance of the crosslinked olefin polymer is suitable for the purposes of this invention. Since the degree of fire retardance is dependent in part on the particular crosslinked olefin polymer and halogenated organic moiety to be employed, it is not possible to specify minimum amounts of phosphorus and of halogenated organic moiety which render every suitable olefin polymer self-extinguishing. In view of illustrative teachings and examples of the invention hereinafter, amounts of phosphorus and halogenated organic moiety required to render a particular polymer self-extinguishing can be readily determined by those skilled in the art of fire retardant polymers. Illustratively, however, best results are obtained with about 0.5 to about 20 parts by weight of elemental phosphorus per hundred weight parts of polymer, preferably from about 1 to about 10 parts, and an amount of halogenated organic moiety such that the atomic ratio of phosphorus to halogen is from about 4:1 to about 1:6, preferably from about 2:1 to about 1:3. Especially preferred self-extinguishing compositions contain at least about 5 weight parts of additive which is the sum of elemental phosphorus and halogenated organic moiety per 100 weight parts of polymer.

In making the improved crosslinked olefin polymer composition in accordance with this invention, the elemental phosphorus and the halogenated organic compound or compounds, when the latter are used, are incorporated separately or as a mixture thereof into the polymer by dry-blending the additive ingredients with granular or powdered polymer and feeding the resulting mixture of polymer and additives through a plastic extruder, or by mixing the additives and polymer on a hot roll mill or in a Banbury mixer or by some other conventional technique for incorporating solid additives into a plastic polymer. Of course, when halogen is already a part of the polymer structure to provide the required halogenated organic moiety, additional halogen-containing additive may not be required. At this time, a solid crosslinking additive such as the peroxygen type, e.g. dicumyl peroxide, t-butyl peroxide, t-butyl perbenzoate and others which are commonly employed in the crosslinking of olefin polymers and/or a solid relatively stable, foaming agent such as the azo compounds, e.g., azodicarbonamide, and others commonly employed solid foaming agents such as dinitrosopentamethylene tetramine, sodium bicarbonate, etc., both of which are optional additives in the practice of this invention, may be incorporated into the polymer. If employed, the blowing agent is preferably stable under conditions employed to cross link the polymer. The crosslinking additives are preferably employed in amounts in the range from about 0.002 to about 0.01 mole of additive per 100 grams of polymer and the foaming agent is preferably employed in amounts in the range from about 1 to about 20 weight parts per hundred weight parts of polymer. In addition, minor amounts, preferably up to about 25 weight parts per 100 parts of olefin polymer, of such additives as dyes, stabilizers, fillers, nucleating agents, carbon black, reinforcing materials, e.g., metallic particles or fibers and the like materials which are chemically inert to the elemental phosphorus can also be incorporated into the polymer, but are not required in the invention. In some cases up to 100 weight parts of fillers per 100 weight parts of polymer may be employed.

In a particularly desirable embodiment, a composition of from about 1 to about 20 weight parts of carbon black, from about 2 to about 20 weight parts of phosphorus, from about 2 to about 20 weight parts of halogen in form of halogenated organic moiety, up to 1.5 weight parts of crosslinking agent and 100 weight parts of polymer is employed. Such composition is particularly useful as cable jacketing, molded articles, etc. If a foamed polymer is desired, then from about 1 to about 15 weight of foaming agent per 100 parts of polymer is beneficially employed in the foregoing preferred composition.

In the preparation of crosslinked olefin polymer foam, it is most advantageous to employ the process disclosed in U.S. Pat. No. 3,562,367 to Shinohara et al. which is incorporated herein in its entirety. Accordingly, a sheet of the composition comprising olefin polymer, halogenated organic moiety, phosphorus and foaming agent is first subjected to ionizing radiation, usually in dosages from about 0.1 to about 10 megarad, preferably from 0.2 to 6 megarad. Thereafter the irradiated sheet is floated on a heated bath while irradiating it with heat rays. The resultant foamed sheet is found to possess fire retardance superior to that of a similar foamed sheet employing antimony oxide instead of phosphorus as a synergist.

Alternatively, crosslinked olefin polymer foam is prepared by incorporating halogenated organic moiety, phosphorus, foaming agent and crosslinking agent into heated, plastified olefin polymer on a heated roll mill, Banbury mill or other suitable mixing device. The temperature is kept below ~ 130°-140° C. to avoid crosslinking. The compounded olefin polymer is then placed in a compression molding press and the temperature gradually raised to 200°-220° C. The press is cooled to room temperature, the molded sample removed, and placed in a heated (150° C.) air oven, which produces the foamed article. Such alternative methods for preparing crosslinked foamed polymers are further described in U.S. Pat. No. 3,098,831 to Carr and U.S. Pat. No. 3,098,832 to Pooley et al.

In the preparation of solid (non-foamed) articles of flame retardant crosslinked olefin polymer, the olefin polymer having elemental phosphorus, halogenated organic moiety and optionally a crosslinking agent incorporated therein is advantageously ground, cut or broken into granular form and then extruded, molded or otherwise fabricated by conventional techniques into the desired shape. During or after fabrication, the polymer is crosslinked by heating, irradiation, action or crosslinking agent or combinations thereof. Conditions for crosslinking the olefin polymer depend on the polymer, amount and type of crosslinking agent, and degree of crosslinking desired. Ordinarily, however, temperature in the range from about 160° to about 230° C. and ionizing radiation dosages in the range from about 0.1 to about 10 megarad are employed, preferably from about 0.2 to about 6 megarad.

The following examples illustrate ways in which the principle of the invention has been applied, but are not to be construed as limiting its scope. All parts and percentages are by weight unless otherwise indicated.

The tests employed in the following examples and the usage herein of the terms "self-extinguishing", "fire-retardant" and the like refer to the suppressed ignition properties of the polymeric composition being described or exemplified. Accordingly, the ignition or burning characteristics of such compositions when exposed to small scale ignition sources are being described. It is well recognized by those skilled in the art and should be clearly understood by others that all of such compositions will burn when subjected to a sufficiently intense heat source.

EXAMPLE 1

One hundred parts of granular polyethylene having a density of 0.915 and a melt index of 5.5 decigrams/minute as determined by ASTM D-1238-65T(E) together with 3.96 parts of elemental red phosphorus having a specific gravity of 2.20 and an average particle size of <75 microns, 12 parts of decabromodiphenyl oxide (atomic ratio of P:Br~1:1) and 15 parts of azodicarbonamide are compounded thoroughly in a twin-screw mixing extruder at temperatures of about 130°-140° C. such that the entire mass is plastified and apparently homogeneous. The resultant mixture is extruded into a continuous sheet having a width of 130 mm and a thickness of 2-3 mm using a sheet extruder having a slit die. The resulting sheet is irradiated with 1.5 megarad of electron rays by means of a Van de Graff's accelerator. The sheet is fed continuously to the top of a molten salt bath comprising 53% $KNO_3$, 7% $NaNO_3$, and 40% $NaNO_2$ which is heated to 225° C. The bath is contained in a tank having feeding and takeup rolls at its two ends. Infrared heaters are located above the bath. Heating and foaming of the sheet is effected to produce a foamed sheet having a width of 300 mm, a thickness of 6-7 mm and an apparent specific gravity of 0.04.

The foamed sheet is tested for its self-extinguishing properties by the following procedure (which is comparable to or more severe than the conditions prescribed by UL Standard Test No. 94 and ASTM D-635-44I): a sample (2.5 cm × 1.2 cm × 23 cm) of the foamed product is inclined at a 30° angle below horizontal while in a draft-free enclosure; a gas flame ~1 in. high is applied to the lower end of the sample for 5 sec. which causes ignition; the flame is then removed and the time for the ignited sample to extinguish itself is measured. There are up to 30 ignitions, up to 10 for each of 2 or 3 samples depending on burning time. The average self-extinguishing time for the foam samples (Sample No. 1) is recorded in Table I. Several similar foams are prepared in a like manner except that different amounts of phosphorus and decabromodiphenyl oxide are employed. The resulting foamed samples (Sample Nos. 2–5) are tested for average extinction time and the results are recorded in Table I.

For purposes of comparison, several polyethylene foams are prepared and tested under similar conditions as above except that antimony trioxide is substituted for phosphorus. The resulting foam samples (Sample Nos. $A_1$–$A_5$) are tested for average self-extinction time and the results are recorded in Table I.

TABLE I

| Sample No. | Decabromo-diphenyl Oxide pph | Red Phosphorus pph | Antimony Oxide pph | Foam Density, pcf(1) | ASET(2) sec |
|---|---|---|---|---|---|
| 1 | 12 | 3.96 | — | 2.44 | 0.5 |
| 2 | 10 | 3.30 | — | 2.49 | 0.3 |
| 3 | 8 | 2.64 | — | 2.25 | 0.6 |
| 4 | 6 | 1.98 | — | 2.37 | 1.0 |
| 5 | 4 | 1.32 | — | 2.38 | 2.3 |
| $A_1$* | 12 | — | 6.24 | 2.56 | 2.2 |
| $A_2$* | 10 | — | 5.20 | 2.50 | 1.9 |
| $A_3$* | 8 | — | 4.16 | 2.75 | 5.8 |
| $A_4$* | 6 | — | 3.12 | 2.74 | Burned |

TABLE I-continued

| Sample No. | Decabromo-diphenyl Oxide pph | Red Phosphorus pph | Antimony Oxide pph | Foam Density, pcf(1) | ASET(2) sec |
|---|---|---|---|---|---|
| A₅* | 4 | — | 2.08 | 2.82 | Burned |

*Not an example of the invention
(1) Foam density in pounds per cubic foot wherein each side of foamed sample has skin.
(2) Average Self Extinction Time as determined by the method described in Example 1.

EXAMPLE 2

Following the procedure of Example 1 except that 0.15 parts of trimethylolpropane triacrylate is included in the composition and an ionizing radiation dose of 0.75 megarad is employed, a foam sample is prepared and tested for average self-extinction time (ASET) using the method described in Example 1. ASET for the sample is found to be 0.6 second.

EXAMPLE 3

Following the procedure of Example 1, several foam samples (Sample Nos. 1–6) employing different olefin polymers and halogenated organic compounds are prepared and tested for foam density and ASET. The results are recorded in Table II.

For the purposes of comparison, several similar samples are prepared in which antimony oxide is substituted for phosphorus. The resulting foam samples (Sample Nos. A₁–A₄) are similarly tested for foam density and ASET and the results are recorded in Table II.

EXAMPLE 4

Several samples of solid (non-foamed) olefin polymers are prepared by compounding various proportions (specified in Table I hereinbefore) of a variety of olefin polymers, elemental red phosphorus and a variety of halogenated organic compounds on a laboratory mill of the Banbury type using the milling conditions specified in Example 1. The resulting samples (Sample Nos. 1–6) are compression molded into test bars at temperatures of 140°–180° C.

The resulting test bars (⅝ inch × ⅛ inch × 8 inch) are tested for ASET. The results are shown in Table I.

For purposes of comparison, several samples are similarly prepared except that antimony oxide is substituted for elemental red phosphorus. The resulting samples (Sample Nos. A₁–A₄) are tested for ASET and the results are recorded in Table III.

TABLE III

| Sample No. | Olefin Polymer | Halogenated Organic Compound Type | Amount, pph | Red Phosphorus pph | Antimony Oxide pph | ASET(1) sec |
|---|---|---|---|---|---|---|
| 1 | PE (a) | Cl Wax (c) | 8 | 4.94 | — | 1.0 |
| 2 | PE (a) | Cl Wax (c) | 6 | 3.71 | — | 1.3 |
| A₁* | PE (a) | Cl Wax (c) | 8 | — | 7.78 | 3.7 |
| A₂* | PE (a) | Cl Wax (c) | 6 | — | 5.84 | 6.6 |
| 3 | PE (a) | C₆H₆Br₅Cl (d) | 10 | 3.02 | — | 0.9 |
| 4 | PE (a) | C₆H₆Br₅Cl (d) | 8 | 2.42 | — | 1.6 |
| A₃* | PE (a) | C₆H₆Br₅Cl (d) | 10 | — | 4.74 | Burned |
| A₄* | PE (a) | C₆H₆Br₅Cl (d) | 8 | — | 3.78 | Burned |
| 5 | PE (a) | TBPCA (e) | 8 | 2.96 | — | 1.0 |
| 6 | EVA (b) | Br₁₀DPO (f) | 10 | 3.30 | — | 3.6 |

*Not an example of this invention
(a)-(f) Same as in Table II
(1) Same as (2) in Table I

EXAMPLE 5

On a heated 2-roll mill is placed 60 g. of polyethylene having a density of 0.915 and a melt index of 5.5 de-

TABLE II

| Sample No. | Olefin Polymer 100 pph | Halogenated Organic Compound Type | Amount, pph | Red Phosphorus pph | Antimony Oxide pph | Density(1) pcf | ASET(2) sec |
|---|---|---|---|---|---|---|---|
| 1 | PE (a) | Cl Wax (c) | 8 | 4.94 | — | 2.08 | 1.3 |
| 2 | PE (a) | Cl Wax (c) | 6 | 3.71 | — | 1.62 | 2.9 |
| A₁* | PE (a) | Cl Wax (c) | 8 | — | 7.78 | 3.16 | ~13 |
| A₂* | PE (a) | Cl Wax (c) | 6 | — | 5.84 | 2.79 | Burned |
| 3 | PE (a) | C₆H₆Br₅Cl (d) | 10 | 3.02 | — | 1.62 | 0.7 |
| 4 | PE (a) | C₆H₆Br₅Cl (d) | 8 | 2.42 | — | 1.45 | 1.1 |
| A₃* | PE (a) | C₆H₆Br₅Cl (d) | 10 | — | 4.74 | 2.86 | Burned |
| A₄* | PE (a) | C₆H₆Br₅Cl (d) | 8 | — | 3.78 | 3.09 | Burned |
| 5 | PE (a) | TBPCA (e) | 8 | 2.96 | — | 1.48 | 0.7 |
| 6 | EVA (b) | Br₁₀DPO (f) | 6 | 1.98 | — | 5.33 | 2.1 |

*Not an example of the invention
(a) PE - polyethylene of Example 1
(b) EVA - ethylene/vinyl acetate copolymer (96/4) having melt flow viscosity [ASTM D-1238-64T(E)] of 2 decig/min
(c) Cl Wax - chlorinated paraffin wax having a chlorine content of 70 weight percent.
(d) C₆H₆Br₅Cl - pentabromochlorocyclohexane
(e) TBPCA - Bis(tribromoneopentyl) ester of chlorendic acid
(f) Br₁₀DPO - decabromodiphenyl oxide
(1)-(2) - Same as in Table I cig/min. To the heat plastified polyethylene are added a dry powder mixture of decabromo diphenyl oxide, elemental red phosphorus or $Sb_2O_3$, in varying amounts, 2.5 pph of 40% dicumyl peroxide (0.0037 moles active) and 15 pph azodicarbonamide.

The mixtures are thoroughly mixed taking the soft polymer off, folding it and reintroducing it into the roll mill 6 times while keeping the temperature below 140° C. The mixed formulation is then removed, formed into a cylinder and cut into discs ~ ¼ – ½ inch thick.

Approximately 30 g. of this product is placed in a mold cavity 4 inches × 2 inches × 3/16 inch in a cold press, and heated. The heat control for the mold is set at 215°–220° C. The mold is closed as soon as plastic flow permits, (after ~ 18 min and a temperature of ~ 125° C.). Ram pressure on the mold is maintained at 700 psig. When the temperature reaches 215°–220° C. (~ 45 minutes), the mold is cooled to 25° C. and the molding placed in an air oven at 150°–155° C. for 10 min to foam it.

The samples had an extremely fine cell structure; foam densities are ~ 0.05 g/cc. Strips 2.5 cm wide are cut from these foam samples, the strips are tested for self-extinguishing properties and the results are recorded in Table IV.

TABLE IV

| Sample No. | Decabromo Diphenyl oxide pph | Red Phosphorus pph | Antimony oxide pph | ASET(1), sec |
|---|---|---|---|---|
| 1 | 8 | 2.64 | — | 2.5 |
| 2 | 6 | 1.98 | — | 4.6 |
| $C_1$* | 8 | — | 4.16 | Burned |
| $C_2$* | 6 | — | 3.12 | Burned |

*Not an example of this invention
(1)Same as (2) in Table I.

What is claimed is:

1. In an olefin polymer composition containing a halogenated organic moiety which is active chlorinated organic compound, active brominated organic compound, passive brominated organic compound or hexachlorocyclopentadiene, dimerized hexachlorocyclopentadiene, hexachloroendomethylene tetrahydrophthalic acid or a derivative thereof and having the halogen concentration from about 5 to about 95 weight percent based on said moiety, the olefin polymer being selected from the group consisting of homopolymers and copolymers of aliphatic hydrocarbon monoolefins having no more than 12 carbon atoms, substituted α-monoolefins wherein the substituent is carboxylic acid, alkyl or haloalkyl ester of carboxylic acid wherein alkyl or haloalkyl has from 1 to 12 carbon atoms, acyl having from 1 to 12 carbon atoms, carboxylate having from 1 to 12 carbon atoms, alkoxyl having from 1 to 12 carbon atoms, and aryloxy having 6 to 12 carbon atoms, the improvement wherein the olefin polymer is crosslinked to at least its gel point and contains a flame retarding amount of elemental phosphorus having a specific gravity greater than 2.0.

2. The improvement according to claim 1 which contains a self-extinguishing amount of elemental phosphorus having a specific gravity greater than 2.0.

3. The improvement according to claim 1 wherein the concentration of phosphorus is from about 0.5 to about 20 parts by weight per 100 parts of polymer and the atomic ratio of phosphorus to halogen is from about 4:1 to about 1:6.

4. The improvement according to claim 1 wherein the halogenated organic moiety is chlorinated paraffin wax, the chlorine concentration being from about 25 to about 97 weight percent based on the halogenated organic moiety.

5. The improvement according to claim 1 wherein the concentration of phosphorus is from about 1 to about 10 parts, the atomic ratio of phosphorus to halogen is from about 2:1 to about 1:3 and the sum of amount of phosphorus and amount of halogenated moiety is at least 5 parts based on 100 weight parts of polymer.

6. The improvement of claim 1 wherein the olefin polymer composition is foamed.

7. The improvement according to claim 1 wherein the olefin polymer is an aliphatic hydrocarbon α-monoolefin polymer and the halogenated organic moiety is hexachlorocyclopentadiene, dimerized hexachlorocyclopentadiene, hexachloroendomethylene tetrahydrophthalic acid or a derivative thereof.

8. The improvement according to claim 1 wherein the olefin polymer is an ethylene/vinyl acetate copolymer or polyethylene.

9. The improvement according to claim 7 wherein the α-monoolefin polymer is polyethylene and the halogenated organic moiety is hexabromocyclododecane.

10. The improvement according to claim 3 wherein the olefin polymer is polyethylene and the halogenated organic moiety is a passive brominated organic compound selected from the group consisting of decabromo diphenyl oxide, 2,3,3-tribromoallyl 2,4,6-tribromophenyl ether, 1-(2,4,5-tribromophenyl)-1-(2,4,6-tribromophenoxy)ethane, pentaerythrityltetrabromide and bis(2,3,3-tribromoallyl)maleate.

11. The improvement of claim 1 wherein the olefin polymer is crosslinked by exposing said polymer to ionizing irradiation at a dosage from about 0.1 to 10 megarad.

12. The process for preparing a fire retardant, crosslinked olefin polymer foam which comprises subjecting a sheet of an olefin polymer containing a halogenated organic moiety, a flame retarding amount of elemental phosphorus having a specific gravity greater than 2 and a foaming amount of a foaming agent to a dosage of ionizing radiation in the range from about 0.2 to about 6 megarad and thereafter floating the sheet on a heated salt bath while irradiating the sheet with heat rays.

13. The improvement of claim 1 wherein the olefin polymer is crosslinked using a chemical crosslinking agent.

14. An improved olefin polymer composition prepared by the process of claim 12.

* * * * *